(12) United States Patent
Cui (10) Patent No.: US 11,472,318 B2
(45) Date of Patent: Oct. 18, 2022

(54) CHILD CONVEYANCE APPARATUS

(71) Applicant: Wonderland Switzerland AG, Steinhausen (CH)

(72) Inventor: Zong Wang Cui, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 53 days.

(21) Appl. No.: 17/093,477

(22) Filed: Nov. 9, 2020

(65) Prior Publication Data
US 2021/0146809 A1 May 20, 2021

(30) Foreign Application Priority Data

Nov. 14, 2019 (CN) .......................... 201921970811.9

(51) Int. Cl.
| | | |
|---|---|---|
| B60N 2/28 | (2006.01) | |
| B60N 2/90 | (2018.01) | |
| B62B 7/00 | (2006.01) | |
| B62B 9/10 | (2006.01) | |
| B62B 9/14 | (2006.01) | |

(52) U.S. Cl.
CPC ......... B60N 2/2884 (2013.01); B60N 2/2872 (2013.01); B60N 2/90 (2018.02); B62B 7/006 (2013.01); B62B 9/102 (2013.01); B62B 9/142 (2013.01)

(58) Field of Classification Search
CPC ....... B60N 2/2884; B60N 2/2872; B60N 2/90
See application file for complete search history.

(56) References Cited

U.S. PATENT DOCUMENTS 4,378,946 A * 4/1983 Voytko .................... B62B 7/123
297/184.11 X
5,553,914 A 9/1996 Holladay

FOREIGN PATENT DOCUMENTS

| CN | 103 723 181 B | 4/2014 |
| CN | 109927594 A | 6/2019 |
| CN | 110254303 A | 9/2019 |
| JP | 1992095874 U | 8/1992 |

(Continued)

OTHER PUBLICATIONS

Office Action and search report dated Jan. 4, 2022 on Japanese counterpart 2020-189072 along with English translations thereof.

(Continued)

Primary Examiner — Anthony D Barfield
(74) Attorney, Agent, or Firm — NZ Carr Law Office PLLC (57) ABSTRACT

A child conveyance apparatus includes a child support portion having a canopy mount, a canopy installable on and removable from the child support portion, the canopy including a coupling part that is engaged with the canopy mount when the canopy is installed on the child support portion and disengaged from the canopy mount when the canopy is removed from the child support portion, the coupling part having a plurality of installation positions with respect to the canopy mount that correspond to different heights of the canopy on the child support portion, and a latch provided on one of the canopy mount and the coupling part, the latch being operable to engage with different locations on the other one of the canopy mount and the coupling part for holding the coupling part in the installation positions.

15 Claims, 7 Drawing Sheets

(56) References Cited

FOREIGN PATENT DOCUMENTS

| | | | |
|---|---|---|---|
| JP | H0495874 U | * | 8/1992 |
| JP | 2016150654 A | | 8/2016 |

OTHER PUBLICATIONS

International Search Report of the corresponding PCT Application No. PCT/EP2020/082144 dated Feb. 22, 2021.
Office Action and search report dated Dec. 30, 2021 on Taiwanese counterpart 109139354 along with an English translation thereof.

* cited by examiner

CHILD CONVEYANCE APPARATUS

CROSS-REFERENCE TO RELATED APPLICATION(S)

This application claims priority to Chinese patent application no. 201921970811.9 filed on Nov. 14, 2019.

BACKGROUND

1. Field of the Invention

The present invention relates to child conveyance apparatuses having a canopy.

2. Description of the Related Art

Child conveyance apparatuses such as child safety seats or strollers may have a canopy for protecting a child from external light. The canopy is usually attached to the child conveyance apparatus at a fixed location, and has a structure that can be folded or expanded as desired and pivoted for adjustment of its angular position according to the direction of the external light. Unfortunately, the conventional canopy may not be adapted for use in certain circumstances, e.g., when a child grows up and the position of the canopy is no longer adapted to provide protection for a taller child.

Therefore, there is a need for an improved design that offers more flexibility in use, is easy to operate, and address at least the foregoing issues.

SUMMARY

The present application describes a child conveyance apparatus having a canopy that offers more flexibility in use.

According to an embodiment, the child conveyance apparatus includes a child support portion having a canopy mount, a canopy installable on and removable from the child support portion, the canopy including a coupling part that is engaged with the canopy mount when the canopy is installed on the child support portion and disengaged from the canopy mount when the canopy is removed from the child support portion, the coupling part having a plurality of installation positions with respect to the canopy mount that correspond to different heights of the canopy on the child support portion, and a latch provided on one of the canopy mount and the coupling part, the latch being operable to engage with different locations on the other one of the canopy mount and the coupling part for holding the coupling part in the installation positions.

According to an embodiment, the canopy is installed on the child support portion by sliding the coupling part over the canopy mount.

According to an embodiment, the canopy mount protrudes from a sidewall of the child support portion, and the coupling part has a cavity adapted to receive at least partially the canopy mount when the canopy is installed on the child support portion.

According to an embodiment, the coupling part has an opening connected with the cavity, and the canopy mount is insertable through the opening into the cavity by sliding the coupling part over the canopy mount.

According to an embodiment, the canopy mount is fixedly connected with a sidewall of the child support portion.

According to an embodiment, the latch is carried with the coupling part, and is movable to engage with or disengage from the canopy mount.

According to an embodiment, the latch includes a resilient portion connected with the coupling part, the latch being elastically deflectable to engage with or disengage from the canopy mount.

According to an embodiment, the latch including the resilient portion is formed integrally with the coupling part.

According to an embodiment, the canopy mount has a plurality of locking openings respectively corresponding to the installation positions, and the latch is movable to engage with any of the locking openings to lock the coupling part to the canopy mount.

According to an embodiment, the coupling part further has an opening connected with the cavity, and the canopy mount is insertable through the opening into the cavity by sliding the coupling part over the canopy mount, the coupling part sliding with the canopy mount at least partially received therein for adjustment between the installation positions.

According to an embodiment, the latch is connected with an actuating portion that is operable to cause the latch to move for disengaging from the canopy mount.

According to an embodiment, the actuating portion is formed integrally with the latch.

According to an embodiment, the canopy includes a support frame pivotally connected with the coupling part, and a covering attached to the support frame.

According to an embodiment, the child support portion includes a seat shell having a seat portion and a backrest portion fixedly connected with each other, and a sidewall projecting forward from the backrest portion and extending from a top of the backrest portion toward the seat portion, the canopy mount being fixedly connected with the sidewall.

According to an embodiment, the child conveyance apparatus is implemented as a child safety seat, wherein the sidewall has a side impact protection part adapted to dissipate impact energy during sideways collision, and the canopy mount is placed on the sidewall above the side impact protection part.

DETAILED DESCRIPTION OF THE EMBODIMENTS

Figure 1:
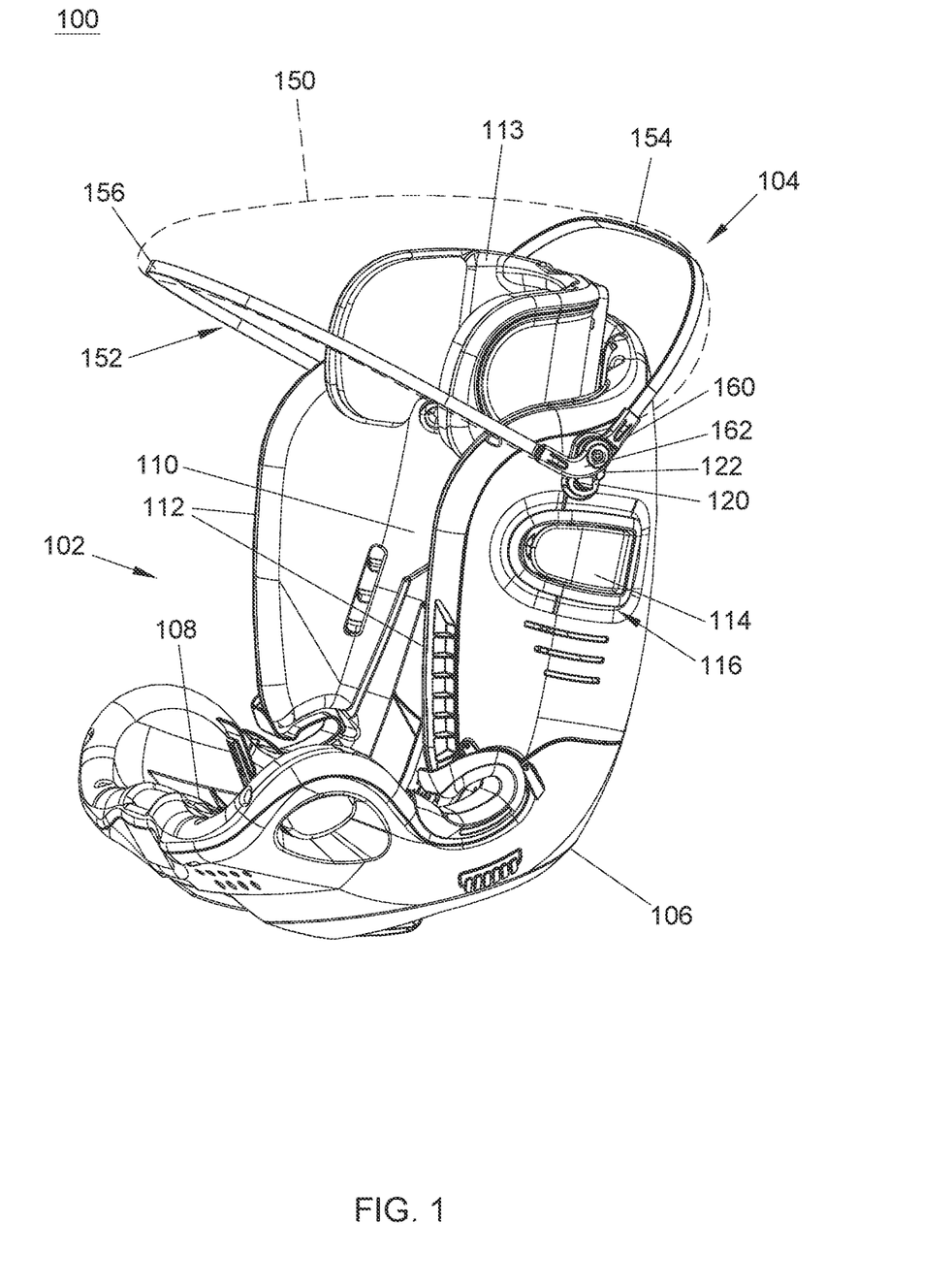
FIG. 1 is a perspective view illustrating an embodiment of a child conveyance apparatus having a canopy.
Figure 2:
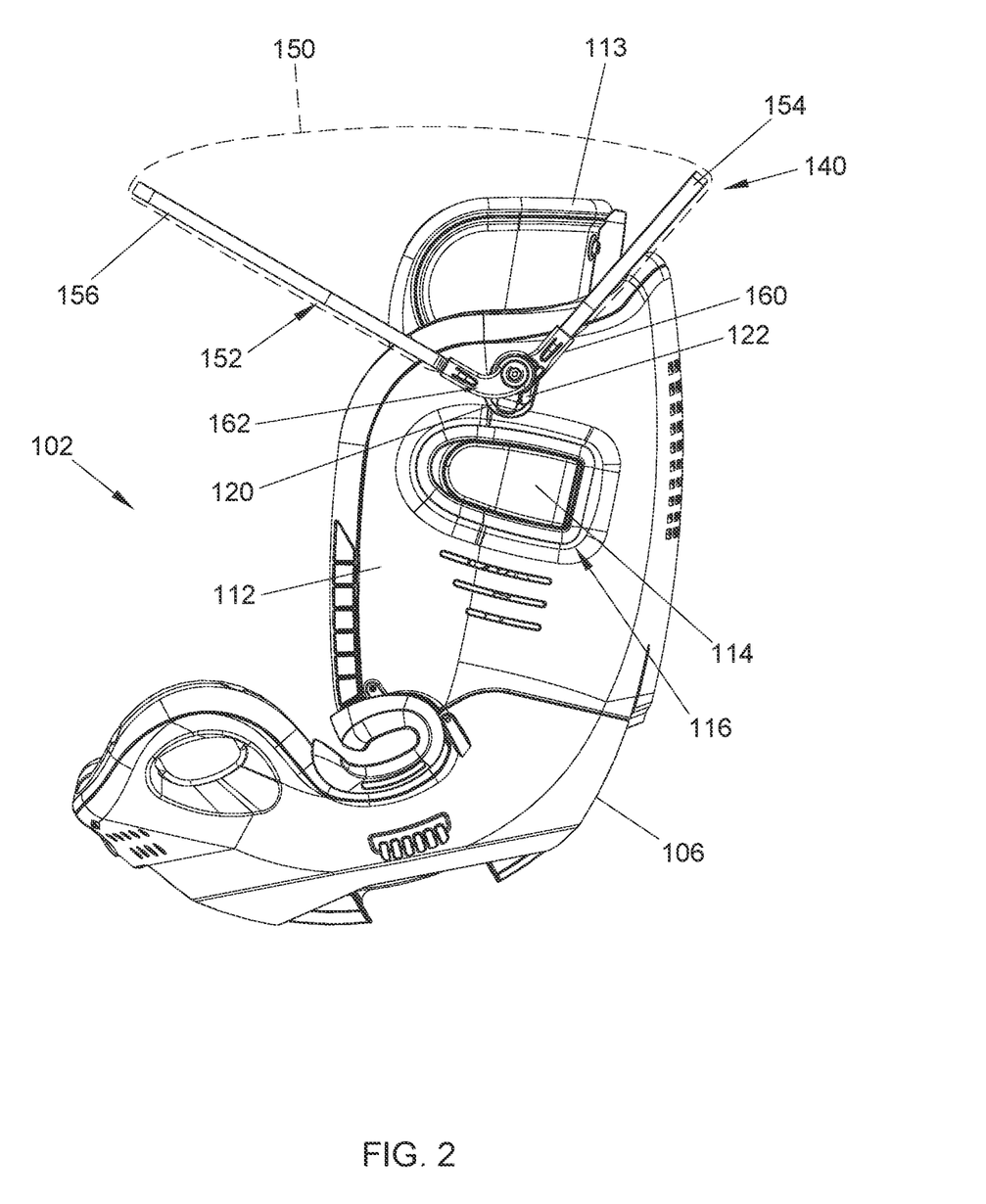
FIG. 2 is a side view of the child conveyance apparatus shown in FIG. 1.

FIGS. 1 and 2 are respectively a perspective and a side view illustrating an embodiment of a child conveyance apparatus 100. Referring to FIGS. 1 and 2, the child conveyance apparatus 100 can include a child support portion 102, and a canopy 104 coupled to the child support portion 102. The child conveyance apparatus 100 is exemplarily a child safety seat, and the child support portion 102 can include a seat shell 106 having a seat portion 108 and a backrest portion 110 fixedly connected with each other. It will be appreciated, however, that the child conveyance apparatus 100 may also include, without limitation, a child stroller, a baby crib, a play yard, an infant highchair, and the like.

The child support portion 102 can have two sidewalls 112 respectively provided at a left and a right side of the seat shell 106. The two sidewalls 112 can be fixedly connected with the backrest portion 110, respectively project forward from the backrest portion 110 at the left and right sides of the seat shell 106, and extend from a top of the backrest portion 110 toward the seat portion 108. The two sidewalls 112 can restrict sideways movements of a child sitting on the seat shell 106 between the two sidewalls 112.

The backrest portion 110 of the child support portion 102 may be connected with a headrest 113, which is disposed between the two sidewalls 112. The headrest 113 can be vertically adjusted on the backrest portion 110 according to the size of a child.

Referring to FIGS. 1 and 2, two side impact protection parts 114 may be provided on the two sidewalls 112. The two side impact protection parts 114 can have a same construction, and can be respectively disposed at symmetric positions on the two sidewalls 112. More specifically, each sidewall 112 can have an opening 116 provided at an outer side thereof for receiving the assembly of the corresponding side impact protection part 114. The side impact protection part 114 is movably connected with the sidewall 112, and may have any suitable construction adapted to provide cushioning effects. Examples of suitable materials for making the side impact protection part 114 may include, without limitation, plastics. The side impact protection part 114 is movable relative to the seat shell 106 at the outer side of the sidewall 112. For example, the side impact protection part 114 can move between a stowed position (as shown in FIG. 1) and a deployed position (not shown). In the stowed position, the side impact protection part 114 may be retracted toward the sidewall 112 and substantially received inside the opening 116 for compact storage. In the deployed position, the side impact protection part 114 may protrude outward and sideways from the sidewall 112. During sideways collision, the side impact protection part 114 in the deployed position may be pressed against a vehicle body (e.g., a vehicle door panel) and consequently deform, crush and/or cause a portion of the seat shell 106 around the side impact protection part 114 to deform for dissipating a portion of the impact energy. According to an example of construction, the side impact protection part 114 may be pivotally connected with the sidewall 112, and is rotatable between the stowed position and the deployed position.

Figure 3:
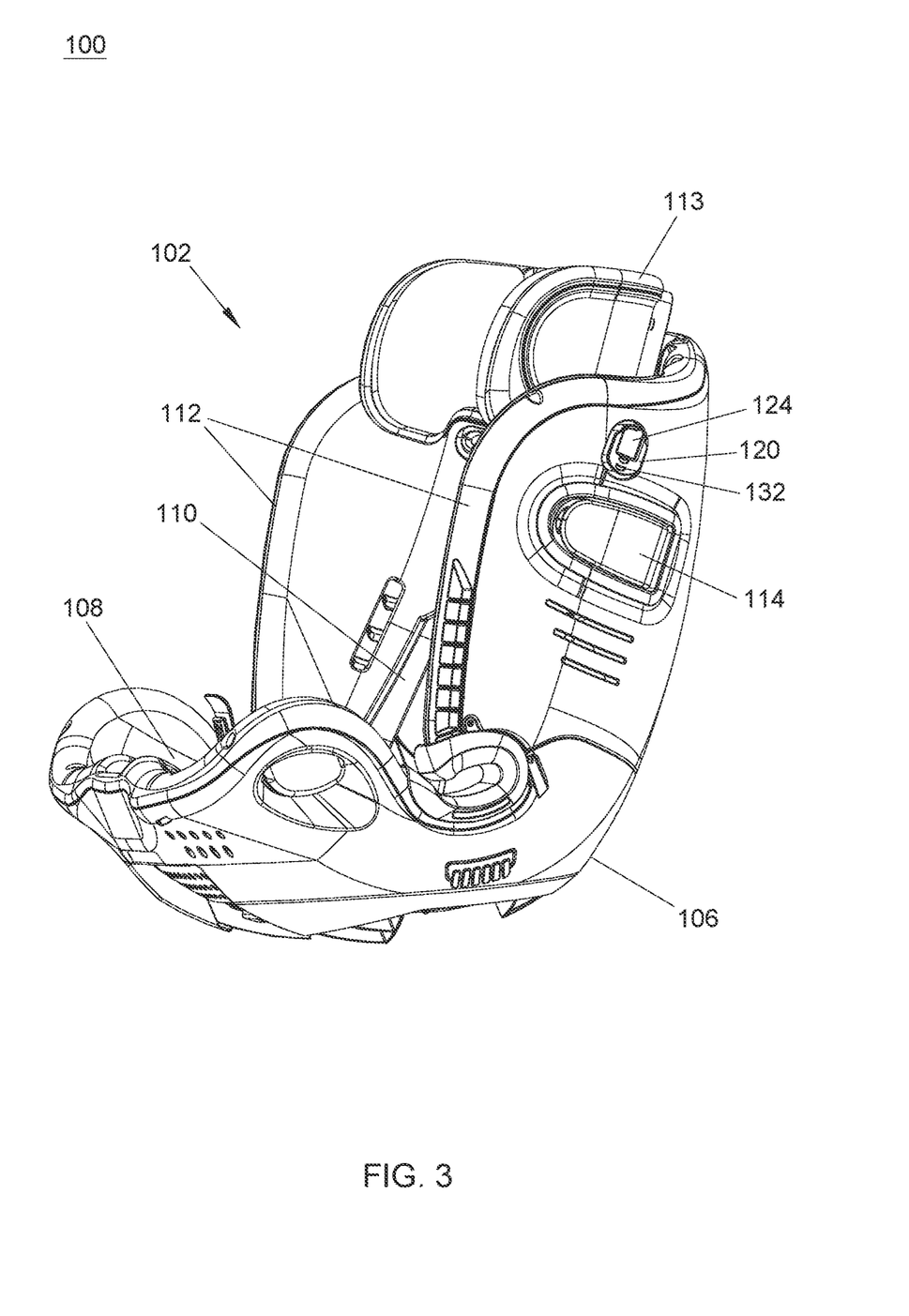
FIG. 3 is a perspective view illustrating the child conveyance apparatus shown in FIG. 1 without the canopy.
Figure 4:
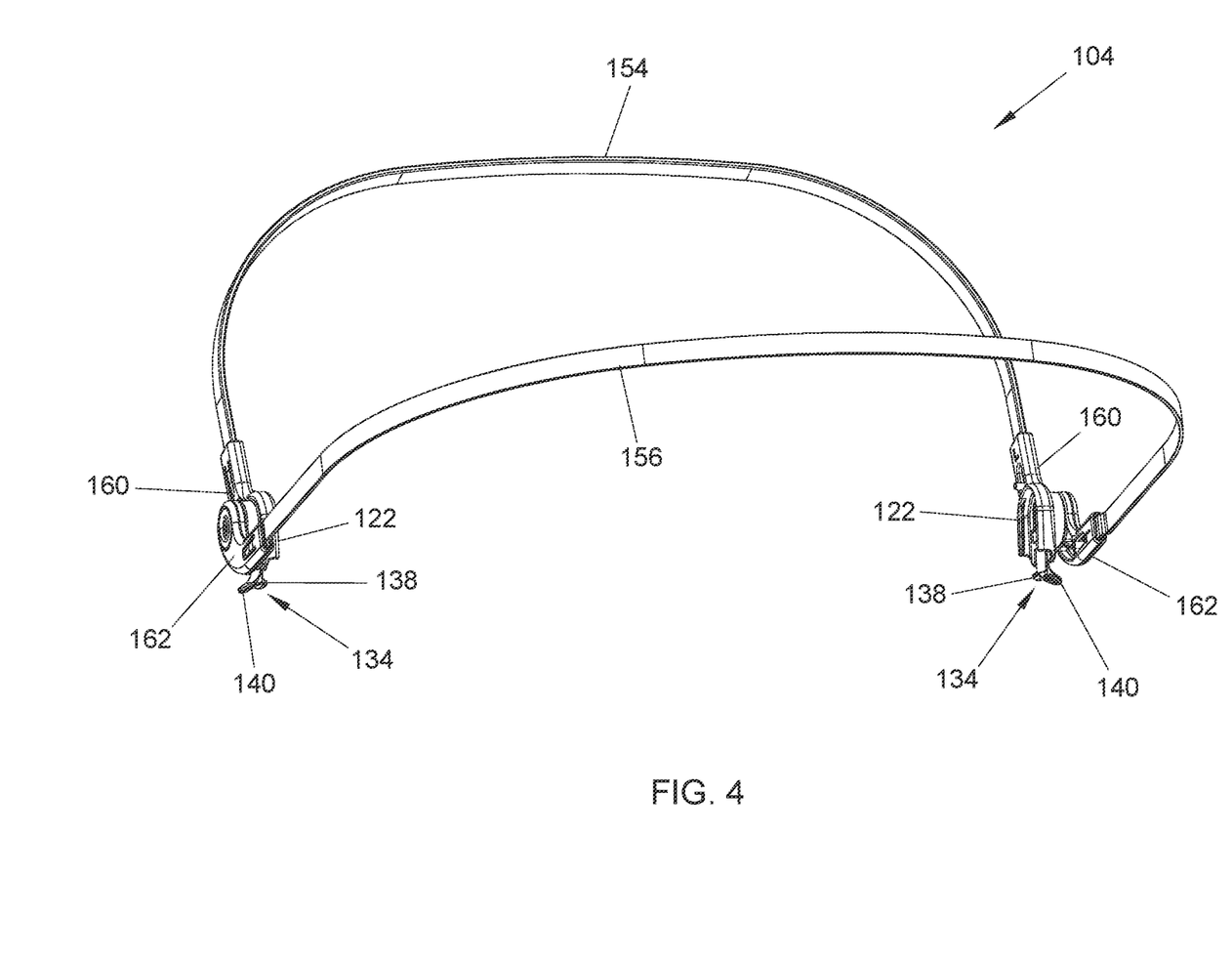
FIG. 4 is a perspective view illustrating the canopy alone.
Figure 5:
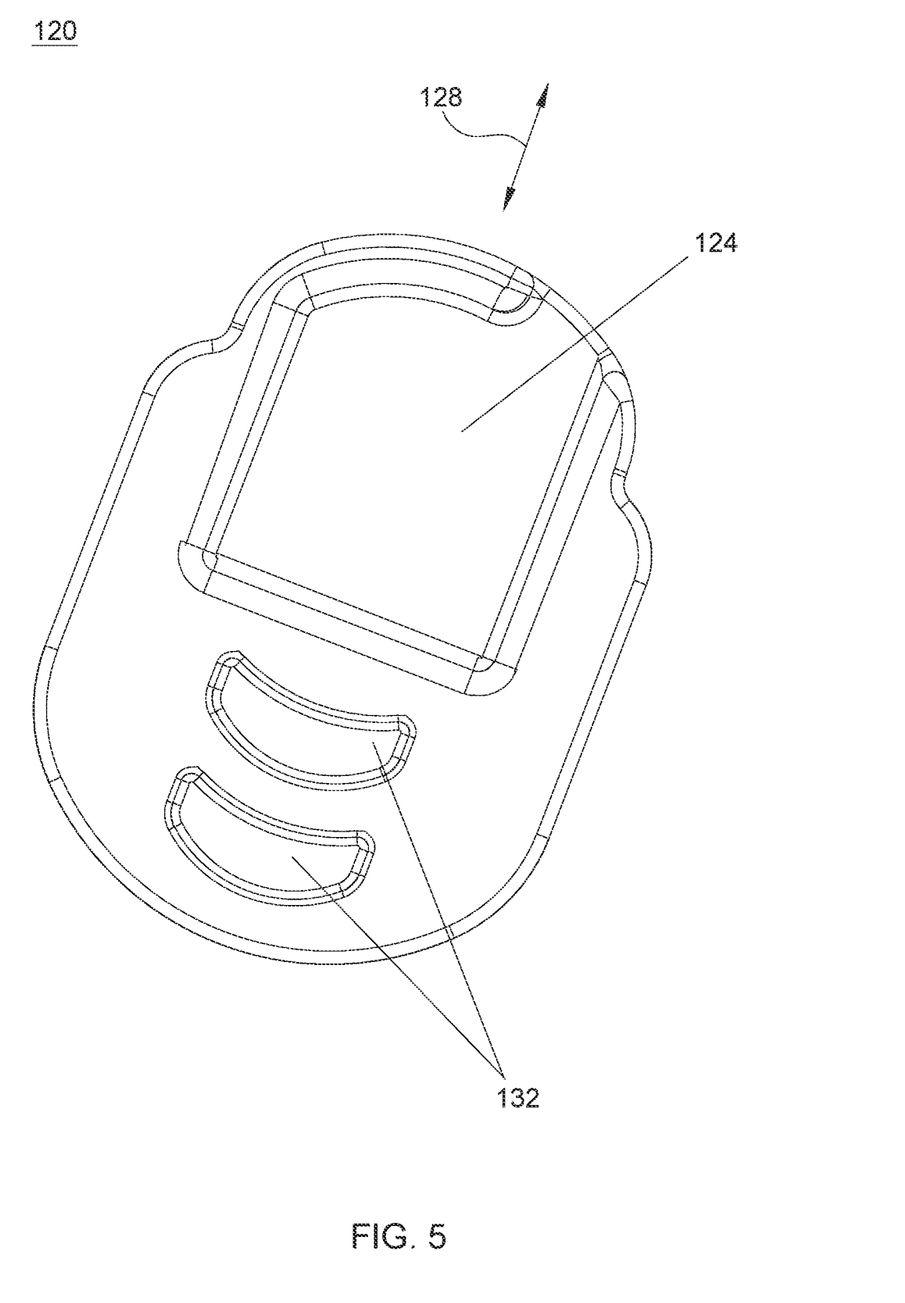
FIG. 5 is a perspective view illustrating a canopy mount that can be provided on a child support portion of the child conveyance apparatus for installing the canopy.
Figure 6:
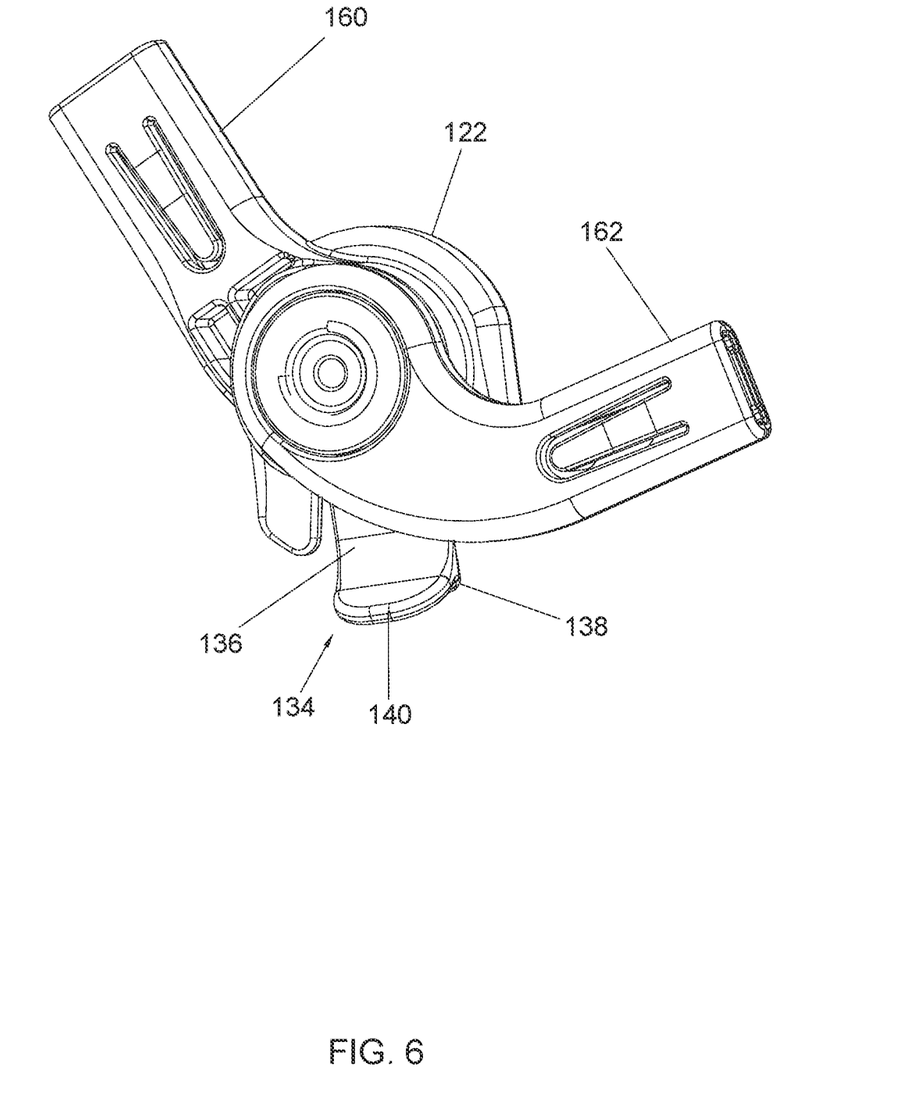
FIG. 6 is a perspective view illustrating some construction details of the canopy.
Figure 7:
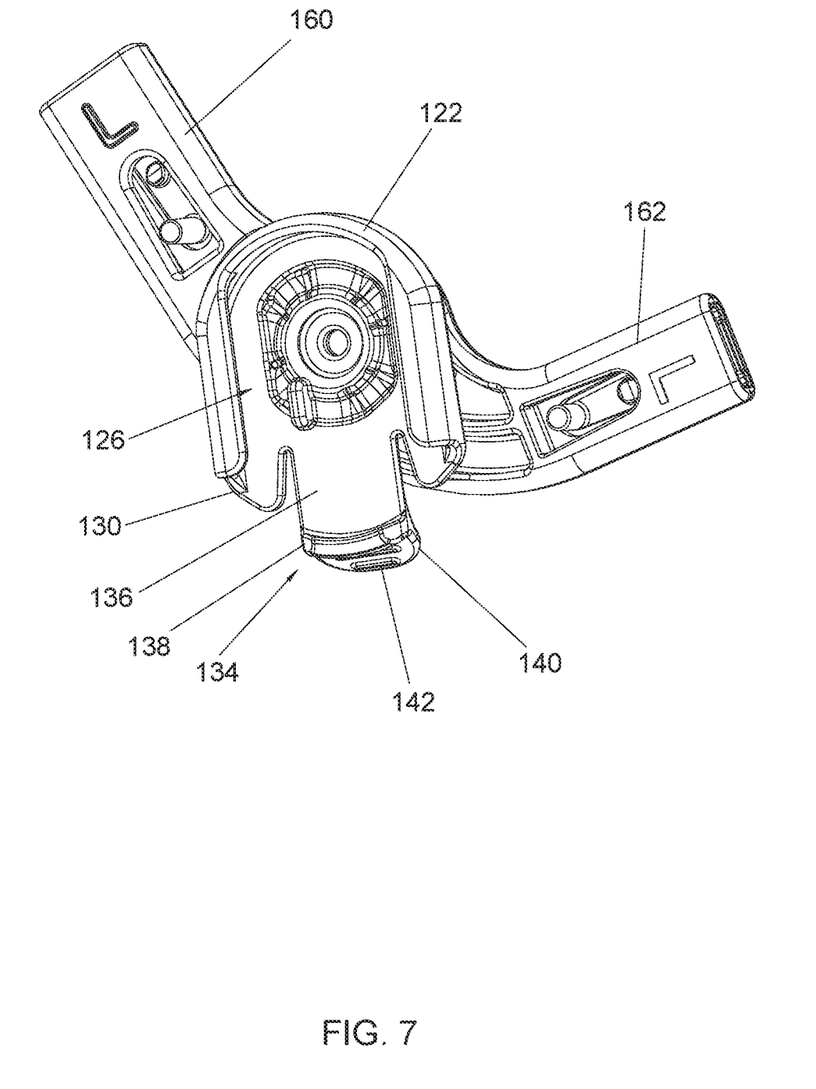
FIG. 7 is another perspective view illustrating further construction details of the canopy provided at a side opposite to that shown in FIG. 6.

The canopy 104 can be coupled to the child support portion 102, and can extend above and at a front of the child support portion 102 to at least partially shelter the child support portion 102 and provide protection for a child. More specifically, the child support portion 102 can include two canopy mounts 120 respectively provided on the two sidewalls 112 at the left and right side of the child support portion 102, and the canopy 104 can include two coupling parts 122 that can be respectively connected with the two canopy mounts 120. In conjunction with FIGS. 1 and 2, FIG. 3 is a perspective view illustrating the child conveyance apparatus 100 without the canopy 104, FIG. 4 is a perspective view illustrating some construction details of the canopy 104, FIG. 5 is a perspective view illustrating some construction details of one canopy mount 120, and FIGS. 6 and 7 are two perspective views illustrating further construction details of the canopy 104 including one coupling part 122.

Referring to FIGS. 1-7, the canopy 104 can be installed on and removed from the child support portion 102 as desired. For example, the two coupling parts 122 can be respectively engaged with the two canopy mounts 120 for installing the canopy 104 on the child support portion 102, and can be respectively disengaged from the two canopy mounts 120 for removing the canopy 104 from the child support portion 102. The two canopy mounts 120 can be respectively connected fixedly with the two sidewalls 112 on the outer surface thereof above the two side impact protection parts 114, and can be similar in construction. The two coupling parts 122 carried with the canopy 104 can have a structure adapted to releasably engage with the two canopy mounts 120, and can be similar in construction. According to an example of construction, each canopy mount 120 can protrude from the outer surface of the sidewall 112 and can have a slot 124, and the corresponding coupling part 122 can include a housing having a cavity 126 adapted to receive at least partially the canopy mount 120. The slot 124 can be received in the cavity 126 when the coupling part 122 is installed on the canopy mount 120. According to an example of construction, the canopy mount 120 may be integrally formed as a single part, which can be fastened to the sidewall 112 of the child support portion 102. According to another example of construction, the canopy mount 120 may be formed integrally with the sidewall 112 of the child support portion 102.

Referring to FIGS. 3-7, according to an example of construction, the coupling part 122 can be installed on the canopy mount 120 by sliding the coupling part 122 along an axis 128. For example, the coupling part 122 can have an opening 130 connected with the cavity 126, and the canopy mount 120 can be inserted through the opening 130 into the cavity 126 by sliding the coupling part 122 generally parallel to the canopy mount 120 along the axis 128. The canopy mount 120 may have an elongate shape with a width that substantially matches a width of the cavity 126 in the coupling part 122, so that rotation of the coupling part 122 relative to the canopy mount 120 can be prevented when the coupling part 122 is installed over the canopy mount 120.

To offer flexibility in use, the canopy 104 can be disposed at different heights on the child support portion 102, which can correspond to different installation positions of the coupling part 122 with respect to the canopy mount 120 at each of the left and right side. For this purpose, one of the canopy mount 120 and the coupling part 122 can have a latch operable to engage with different locations on the other one of the canopy mount 120 and the coupling part 122 for holding the coupling part 122 in the different installation positions. In this manner, the height of the canopy 104 may be adjusted according to the needs, e.g., for accommodating children of different sizes.

According to an example of construction, the canopy mount 120 can have a plurality of locking openings 132 respectively corresponding to the installation positions, and the coupling part 122 can carry a latch 134 movable to engage with or disengage from any of the locking openings 132. The locking openings 132 may be exemplarily disposed below the slot 124 and spaced apart from one another along the axis 128. The latch 134 can be provided on the coupling part 122 adjacent to the cavity 126, and can engage with any of the locking openings 132 as the coupling part 122 slides along the axis 128 over the canopy mount 120. According to an example of construction, the latch 134 can include a resilient portion 136 connected with the coupling part 122, and can be elastically deflectable to engage with and disengage from the canopy mount 120. For example, the resilient portion 136 can have an end provided with a protuberance 138 that can engage or disengage the locking openings 132 on the canopy mount 120. The latch 134 including the resilient portion 136 and the protuberance 138 may be exemplarily formed integrally with the coupling part 122. The latch 134 can elastically deflect relative to the coupling part 122 to engage the protuberance 138 with any of the locking openings 132 or disengage the protuberance 138 from the locking openings 132. The engagement of the protuberance 138 with any one of the locking openings 132 can lock the coupling part 122 to the canopy mount 120 in one corresponding installation position.

Referring to FIGS. 1-7, the latch 134 can be connected with an actuating portion 140 that is operable to cause the latch 134 to move for disengaging from the canopy mount 120. More specifically, a caregiver can operate the actuating portion 140 to urge the latch 134 to deflect away from the canopy mount 120 so that the protuberance 138 can disengage from any of the locking openings 132. The actuating portion 140 may be provided on the resilient portion 136 of the latch 134 (e.g., at the end thereof), and protrude at a side opposite to that of the protuberance 138. According to an example of construction, the actuating portion 140 may be formed integrally with the latch 134. A caregiver can grasp and pull the actuating portion 140 to cause the latch 134 to disengage from the canopy mount 120. According to an example of construction, the actuating portion 140 may have a surface provided with an anti-skid structure 142 for facilitating its manual operation.

According to a variant construction, the placement of the locking openings 132 and the latch 134 may be interchanged, e.g., locking openings may be provided on the coupling part 122, and a latch provided on the canopy mount 120 can engage with any of the locking openings for locking the coupling part 122 to the canopy mount 120 in a desirable installation position.

Referring to FIGS. 1-7, the canopy 104 can further include a covering 150 (shown with phantom lines in FIGS. 1 and 2) and a support frame 152. The covering 150 can be attached to and stretched over the support frame 152. Examples of suitable materials for the covering 150 can include, without limitation, soft materials such as fabrics. The support frame 152 may include at least two rods 154 and 156 that are connected with each of the two coupling parts 122 at the left and right side, the covering 150 being attached to the rods 154 and 156. According to an example of construction, the support frame 152 may be pivotally connected with the coupling parts 122. For example, the rod 154 can have two opposite ends respectively attached to two connecting parts 160, and each connecting part 160 can be pivotally connected with a corresponding coupling part 122 so that the rod 154 is rotatable relative to the coupling part 122 for adjustment. Likewise, the rod 156 can have two opposite ends respectively attached to two connecting parts 162, and each connecting part 162 can be pivotally connected with a corresponding coupling part 122 so that the rod 156 is rotatable relative to the coupling part 122 and the rod 154 for adjustment. The rods 154 and 156 are rotatable relative to each other and the coupling parts 122 to fold or expand the covering 150 as desired and/or modify an angular position of the covering 150 relative to the child support portion 102.

Exemplary operation of the canopy 104 is described hereinafter with reference to FIGS. 1-7. When the canopy 104 is to be installed on the child support portion 102 of the child conveyance apparatus 100, a caregiver can slide the coupling part 122 at each of the left and right side of the canopy 104 along the axis 128 over the corresponding canopy mount 120 so that the canopy mount 120 is at least partially received in the cavity 126 of the coupling part 122. The coupling part 122 can slide until the latch 134 carried with the coupling part 122 engages with one of the locking openings 132 on the canopy mount 120, which thereby locks the coupling part 122 to the canopy mount 120.

For modifying the height of the canopy 104 on the child support portion 102, a caregiver can pull the actuating portion 140 so that the latch 134 disengages from the canopy mount 120 and unlocks the coupling part 122. While the canopy mount 120 remains at least partially received in the cavity 126 of the coupling part 122, the unlocked coupling part 122 can slide along the axis 128 relative to the canopy mount 120 for adjusting the height of the canopy 104. For example, the canopy 104 may be adjusted to a height where the canopy 104 extends above the headrest 113 and a top of the backrest portion 110. Once the canopy 104 is adjusted to a desired height, the latch 134 can engage with one of the locking openings 132 on the canopy mount 120 to lock the coupling part 122 in the corresponding installation position.

For removing the canopy 104 from the child support portion 102, a caregiver can pull the actuating portion 140 so that the latch 134 disengages from the canopy mount 120 and unlocks the coupling part 122. Then the canopy 104 can be moved upward, which causes the coupling part 122 to slide upward and detach from the canopy mount 120. The canopy 104 can be thereby removed from the child support portion 102.

Advantages of the child conveyance apparatus described herein include the ability to provide a removable canopy that is relatively simple in construction. The canopy can be easily installed or removed and can be conveniently adjusted in height as needed, which can offer more flexibility in use.

Realization of the child conveyance apparatus has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:
1. A child conveyance apparatus comprising:
a child support portion having a canopy mount;
a canopy installable on and removable from the child support portion, the canopy including a coupling part that is engaged with the canopy mount when the canopy is installed on the child support portion and disengaged from the canopy mount when the canopy is removed from the child support portion, the coupling part having a plurality of installation positions with respect to the canopy mount that correspond to different heights of the canopy on the child support portion; and
a latch carried with the coupling part, the latch being operable to engage with different locations on the canopy mount for holding the coupling part in the installation positions;
wherein the latch is connected with an actuating portion that is operable to cause the latch to move for disengaging from the canopy mount, the actuating portion protruding away from the canopy mount.
2. The child conveyance apparatus according to claim 1, wherein the canopy is installed on the child support portion by sliding the coupling part over the canopy mount.

3. The child conveyance apparatus according to claim 1, wherein the canopy mount protrudes from a sidewall of the child support portion, and the coupling part has a cavity adapted to receive at least partially the canopy mount when the canopy is installed on the child support portion.

4. The child conveyance apparatus according to claim 3, wherein the coupling part has an opening connected with the cavity, and the canopy mount is insertable through the opening into the cavity by sliding the coupling part over the canopy mount.

5. The child conveyance apparatus according to claim 3, wherein the canopy mount is fixedly connected with the sidewall.

6. The child conveyance apparatus according to claim 1, wherein the latch includes a resilient portion connected with the coupling part, the latch being elastically deflectable to engage with or disengage from the canopy mount.

7. The child conveyance apparatus according to claim 6, wherein the latch including the resilient portion is formed integrally with the coupling part.

8. The child conveyance apparatus according to claim 1, wherein the canopy mount has a plurality of locking openings respectively corresponding to the installation positions, and the latch is movable to engage with any of the locking openings to lock the coupling part to the canopy mount.

9. The child conveyance apparatus according to claim 1, wherein the coupling part slides with the canopy mount at least partially received therein for adjustment between the installation positions.

10. The child conveyance apparatus according to claim 1, wherein the actuating portion is formed integrally with the latch.

11. The child conveyance apparatus according to claim 1, wherein the canopy includes a support frame pivotally connected with the coupling part, and a covering attached to the support frame.

12. The child conveyance apparatus according to claim 1, wherein the child support portion includes a seat shell having a seat portion and a backrest portion fixedly connected with each other, and a sidewall projecting forward from the backrest portion and extending from a top of the backrest portion toward the seat portion, the canopy mount being fixedly connected with the sidewall.

13. The child conveyance apparatus according to claim 12 being implemented as a child safety seat, wherein the sidewall has a side impact protection part adapted to dissipate impact energy during sideways collision, and the canopy mount is placed on the sidewall above the side impact protection part.

14. The child conveyance apparatus according to claim 1, wherein the latch includes a resilient portion connected with the coupling part, the latch being elastically deflectable to engage with or disengage from the canopy mount, and the actuating portion being provided at an end of the resilient portion.

15. The child conveyance apparatus according to claim 1, wherein the actuating portion has a surface provided with an anti-skid structure.

* * * * *